3,054,829
Patented Sept. 18, 1962

3,054,829
PROCESS FOR THE PREPARATION OF BROMONITROALKANES
Gustave B. Bachman and Ronald O. Downs, West Lafayette, Ind., assignors to Purdue Research Foundation, Lafayette, Ind., a corporation of Indiana
No Drawing. Filed Oct. 4, 1961, Ser. No. 142,769
8 Claims. (Cl. 260—644)

Our invention relates to a process for producing beta-bromonitroalkanes. More particularly it relates to an improved process for the production of beta-bromonitroalkanes by the reaction in the presence of dimethylformamide of phosphorus tribromide and a nitro alcohol having the following formula:

$$\begin{array}{cc} NO_2 & R \\ | & | \\ R^1\!-\!-\!-\!CH\!-\!OH \end{array}$$

wherein R is alkyl or hydrogen and $R^1$ is cycloalkyl or the formula:

$$\begin{array}{c} | \\ R_2\!-\!C\!- \\ | \\ R_2 \end{array}$$

and wherein $R_2$ is alkyl, hydrogen, or hydroxyalkyl.

Nitro alcohols of the above-described type have previously been converted into bromonitroalkanes by reaction with phosphorus tribromide. However, the yields obtained in the procurement of such compounds have been relatively poor, generally on the order of 5–15%.

We have now discovered that beta-bromonitroalkanes can be readily produced in yields often in excess of 50–60% by reacting in the presence of dimethylformamide phosphorus tribromide and a nitro alcohol having the following formula:

$$\begin{array}{cc} NO_2 & R \\ | & | \\ R^1\!-\!-\!-\!CH\!-\!OH \end{array}$$

wherein R is alkyl or hydrogen and $R^1$ is cycloalkyl or the formula:

$$\begin{array}{c} | \\ R_2\!-\!C\!- \\ | \\ R_2 \end{array}$$

and wherein $R_2$ is alkyl, hydrogen, or hydroxyalkyl. Examples of nitro alcohols which can be utilized in our process include 2-nitro-2-methyl-1-propanol, tris(hydroxymethyl)nitromethane, 2-nitro-2-methyl-1,3-propanediol, 1-(1-nitrocyclohexyl)ethanol, 2-nitro-2-methyl-1-butanol, 2-nitro-2-methyl-1-decanol, 1-nitro-2-butanol, etc., and the like.

In carrying out the process of our invention, it is generally preferable to use not less than 1 mole of phosphorus tribromide for each mole of nitro alcohol; but when diols or triols of the nitro alcohols are utilized, increased amounts of phosphorus tribromide are desirable. In order to obtain consistently high yields of beta-bromonitroalkanes, we prefer to utilize dimethylformamide in amounts so that it also serves as a solvent for the reactants and the reaction product. However, satisfactory results can be obtained when catalytic amounts of dimethylformamide are utilized. When dimethylformamide is not utilized in amounts necessary to allow it to serve as solvent for the reactants and the reaction products, other suitable solvents can be used. Such solvents include chloroform, carbon tetrachloride, ethylene dichloride, etc., and the like.

The temperature conditions under which the process of our invention can be carried out vary considerably and will ordinarily depend upon the particular nitro alcohol which it is desired to brominate. Generally, temperatures ranging from about 20 to about 100° C. are satisfactory for our process, however, we prefer to utilize temperatures ranging from about 50 to about 90° C.

The beta-bromonitroalkanes produced by the process of our invention find use as insecticides and pesticides.

The following examples are offered to illustrate our invention; however, we do not intend to be limited to the specific materials, proportions, and procedures shown therein. Rather, we intend for all equivalents obvious to those skilled in the art to be included within the scope of our invention.

*Example I*

To a 500-milliliter flask equipped with an agitator containing 150 mls. of dimethylformamide and 59.5 grams of 2-nitro-1-butanol were added 135.5 grams of phosphorus tribromide, the temperature of addition being maintained at about 55° C. On completion of the addition of phosphorus tribromide, the resulting solution was stirred for six hours and then heated to 60° C. and maintained at that temperature for two hours. The thus treated reaction mixture was then cooled and distilled to give 40.0 grams of 1-bromo-2-nitrobutane.

*Example II*

The procedure of Example I was followed with the exception that tris(hydroxymethyl)nitromethane was utilized instead of 2-nitro-1-butanol to obtain tris(bromomethyl)nitromethane.

*Example III*

The procedure of Example I was followed with the exception that 2-nitro-2-methyl-1,3-propanediol was utilized instead of 2-nitro-1-butanol to obtain 2-nitro-2-methyl-1,3-dibromopropane.

*Example IV*

The procedure of Example I was followed with the exception that 1-(1-nitrocyclohexyl)ethanol was utilized instead of 2-nitro-1-butanol to obtain 1-(1-nitrocyclohexyl)-1-bromoethane.

*Example V*

The procedure of Example I was followed with the exception that 1-nitro-2-butanol was utilized instead of 2-nitro-1-butanol to obtain 1-nitro-2-bromobutane.

*Example VI*

To a 500-milliliter flask equipped with an agitator containing a solution consisting of 54.2 grams of phosphorus tribromide and 100 mls. of carbon tetrachloride were slowly added 21.0 grams of 2-nitro-1-propanol and 8.5 mls. of dimethylformamide. The resulting mixture was stirred for about one hour and then heated to about 60° C. and held at that temperature for about two hours. At the end of the two-hour period, the reaction mixture was cooled and the carbon tetrachloride was removed therefrom by decantation. The remaining material was then distilled to give 12.8 grams of 2-nitro-1-bromopropane.

Now having described our invention, what we claim is:

1. In a process for the production of beta-bromonitroalkane by the reaction of a nitro alcohol having the formula:

$$\begin{array}{cc} NO_2 & R \\ | & | \\ R^1\!-\!-\!-\!CH\!-\!OH \end{array}$$

wherein R is a member selected from the group consisting of alkyl and hydrogen; wherein $R^1$ is a member selected from the group consisting of cycloalkyl and the formula:

$$\begin{array}{c} | \\ R_2\!-\!C\!- \\ | \\ R_2 \end{array}$$

and wherein $R_2$ is a member selected from the group consisting of alkyl, hydrogen, and hydroxyalkyl with phosphorus tribromide, the improvement which comprises carrying out the reaction in the presence of dimethylformamide.

2. In a process for the production of beta-bromonitroalkanes by the reaction of a nitro alcohol having the formula:

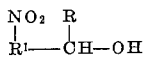

wherein R is a member selected from the group consisting of alkyl and hydrogen; wherein $R^1$ is a member selected from the group consisting of cycloalkyl and the formula:

and wherein $R_2$ is a member selected from the group consisting of alkyl, hydrogen, and hydroxyalkyl with phosphorus tribromide, the improvement which comprises carrying out the reaction in the presence of catalytic amounts of dimethylformamide at temperatures ranging from about 20 to about 100° C. and recovering the thus produced beta-bromonitroalkane therefrom.

3. The process of claim 2 wherein the temperature ranges from about 50 to about 90° C.

4. In a process for the production of tris(bromomethyl)nitromethane by the reaction of tris(hydroxymethyl)nitromethane with phosphorus tribromide, the improvement which comprises carrying out the reaction in the presence of dimethylformamide.

5. In a process for the production of 1-(1-nitrocyclohexyl)-1-bromoethane by the reaction of 1-(1-nitrocyclohexyl)ethanol and phosphorus tribromide, the improvement which comprises carrying out the reaction in the presence of dimethylformamide.

6. In a process for the production of 2-nitro-2-methyl-1-bromopropane by the reaction of 2-nitro-2-methyl-1-propanol and phosphorus tribromide, the improvement which comprises carrying out the reaction in the presence of dimethylformamide.

7. In a process for the production of 2-nitro-2-methyl-1,3-dibromopropane by the reaction of 2-nitro-2-methyl-1,3-propanediol and phosphorus tribromide, the improvement which comprises carrying out the reaction in the presence of dimethylformamide.

8. In a process for the production of 1-nitro-2-bromobutane by the reaction of 1-nitro-2-butanol and phosphorus tribromide, the improvement which comprises carrying out the reaction in the presence of dimethylformamide.

No references cited.